March 13, 1962 W. J. HEACOCK, JR 3,024,999
ELECTRONIC DIVIDER
Filed Feb. 11, 1959

WILLIAM J. HEACOCK, JR.
INVENTOR.

BY Rolla N. Carter
W. O. Quesenberry
ATTORNEYS

United States Patent Office 3,024,999
Patented Mar. 13, 1962

3,024,999
ELECTRONIC DIVIDER
William J. Heacock, Jr., Levittown, N.Y., assignor, by mesne assignments, to the United States of America as represented by the Secretary of the Navy
Filed Feb. 11, 1959, Ser. No. 792,679
1 Claim. (Cl. 235—196)

The present invention relates to electronic dividers and more particularly to an electronic divider that is suitable for use with an analog computer.

An object of the invention is the provision of a computer for the performance of division with high accuracy and good frequency response.

Other objects and advantages of the present invention will be apparent and best understood from the following description when read in conjunction with the accompanying drawing in which.

Figure 1:
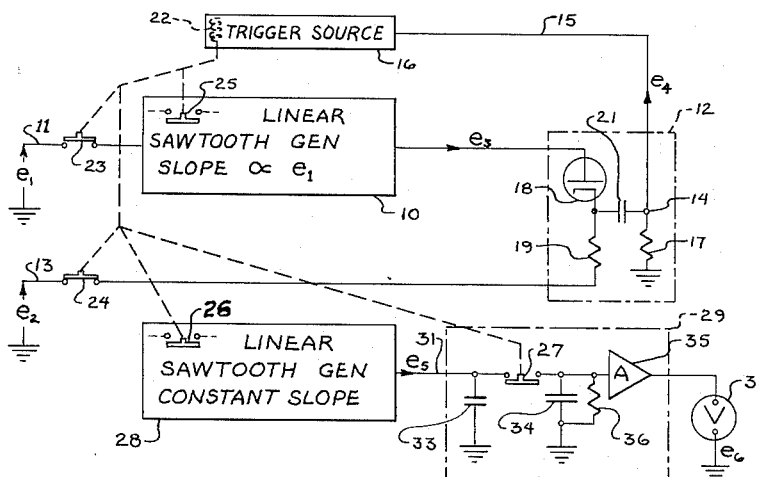
FIG. 1 is a conventionalized showing of an apparatus embodying the invention.

The apparatus illustrated in FIG. 1 comprises a sweep generator 10 for generating a first saw-tooth signal having a slope proportional to the potential of a denominator supply line 11, this potential being designated $e_1$, a comparison circuit 12 coupled to the output of the sweep circuit 10 and to a numerator supply line 13 having a potential $e_2$ and having an output terminal 14 connected through a lead 15 to the input of a trigger source 16 and to ground through a resistor 17. With this arrangement the comparison circuit 12 is essentially a pickup diode 18 having its cathode loaded by a resistor 19 through which it is connected to the numerator supply line 13. When the output voltage from the sweep generator 10 rises just above the voltage $e_2$ the diode 18 conducts to apply through a condenser 21 a small pulse to the terminal 14 and thence through the lead 15 to the trigger source 16 to trip it for a predetermined time interval. In the conventionalized showing of FIG. 1 the trigger source is indicated as having a relay coil 22 arranged to actuate five ganged switches 23, 24, 25, 26 and 27 which, respectively, open the denominator supply line 11 and the numerator supply line 13, close disabling circuits in the sweep generator 10 and in a linear sweep generator 28 and closes a sampling circuit in a peak detector 29. A suitable sawtooth generator having a slope proportional to the input $e_1$ is the Miller-type integrator disclosed in "Electronic Designers' Handbook," published by McGraw-Hill Book Co., Inc., New York, New York (1957), pages 11–8 and 11–9, fig. 11.10. When necessary to obtain the desired polarity for the output voltage $e_3$ a shunt feedback amplifier such as the inverter 40 is inserted in series with the sawtooth sweep generator 10.

The linear sweep generator 28 commences the generation of a second sawtooth signal at the same time as the first saw-tooth signal generated by the sweep 10. The duration of this second saw-tooth signal is determined by the pickup pulse from the pickup device 12 here shown as actuating the switch 26 through the trigger source 16. The saw-tooth signal from the sweep generator 28 appears on the output lead 31 and its peak value is detected by the peak detector 29 which peak value may be fed to a utilization circuit or measured and indicated by a suitable voltmeter 32. As indicated in FIG. 1 the peak detector 29 may comprise an input capacitor 33 of relatively small capacity which is charged to the peak value of the output voltage $e_5$ of the sweep generator 28. Upon closure of the switch 27 the charge on the condenser 33 is transferred to a condenser 34 of relatively high capacity. The resulting voltage across the condenser 34 is passed through an amplifier 35 to the voltmeter 32. The condenser 34 is bypassed by a fairly high resistance 36 so that the RC constant is considerably greater than, say ten times, the repeat frequency of the system. One suitable value for the capacity ratio of the condenser 34 and the condenser 33 is 100 so that during the short time the switch 27 is closed the condenser 33 is quickly discharged with very little residual charge being left thereon.

The operation of the system of FIG. 1 may be briefly outlined as follows:

If it is assumed that the relay contacts 23 to 27 have just moved to the positions indicated, the sweep circuits 10 and 28. When the output voltage $e_3$ equals or, more saw-tooth signals. When the output voltage $e_3$ of the sweep 10 equals the numerator voltage $e_2$ on the lead 13, the pickup pulse $e_4$ on the lead 15 trips the trigger source 16 to energize its relay coil 22 for a short interval of time herein referred to as the relay dwell time. The energization of this relay coil 22 closes the contacts 25 and 26 to terminate the generation of the saw-tooth signals by the sweeps 10 and 28 and to reset them to ground and simultaneously therewith closes the relay contact 27 in the peak detector 29 to obtain a new value for the output voltage $e_6$. Energization of the relay coil 22 also opens the contacts 23 and 24 in the supply lines 11 and 13 but such action is unnecessary and has been illustrated merely as an aid in visualizing the operation of the circuit.

Figure 2:
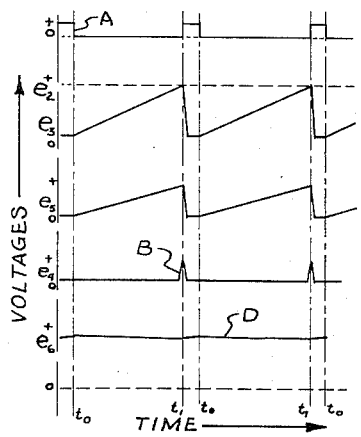
FIG. 2 is a graph utilized in explaining the operation of the device of the invention.

In FIG. 2 the curve A represents the energization of the trigger relay coil 22. These positive pulses of curve A have a width corresponding to the dwell time and are initiated at a time $t_1$, and their termination establishes time $t_0$ which is the starting time for the sweep generators 10 and 28. When the output voltage $e_3$ equals or, more accurately, starts to exceed the numerator voltage $e_2$, a pickup pulse $e_4$ represented by curve B is generated which establishes time $t_1$ at which time the peak value $e_5$ of the constant slope saw-tooth signal from the circuit 28 is detected by the detector 29 and the resulting voltage $e_6$ as measured by the voltmeter 32 is represented by the curve D of FIG. 2.

The manner in which the above described arrangement performs a division of a voltage $E_2$ by a voltage $E_1$ is as follows:

The slope of the first saw-tooth signal is maintained proportional to the voltage $E_1$, and a pickup pulse is developed when the magnitude of the voltage signal equals the voltage $E_2$. A second saw-tooth signal of constant slope is initiated simultaneously with the first saw-tooth signal and is terminated by the pickup pulse, the peak value of the second saw-tooth signal thus being proportional to the quotient of $E_2$ divided by $E_1$.

The several voltage relationships represented in FIGS. 1 and 2 may be set down as follows:

$$e_3 = e_1 t k \qquad (1)$$

where $t = t_1 - t_0$, and $k$ is the proportionality factor. At coincidence of $e_3$ and $e_2$ it follows that $$e_3 = e_2 = e_1 t k \qquad (2)$$

and the time at which this occurs is $$t = \frac{e_3}{e_1 k} = \frac{e_2}{e_1 k} \qquad (3)$$

Since $e_5$ is of constant slope $$e_5 = t k_1 \qquad (4)$$

where $t = t_1 - t_0$ and $k_1$ is the proportionality factor. Therefore at peak amplitude $$e_5 = \frac{e_3}{e_1 k} k_1 = \frac{e_2}{e_1 k} k_1 \tag{5}$$

which shows that the peak value of $e_5$ is proportional to the quotient of the voltage $e_2$ divided by the voltage $e_1$. The peak detector 29 compares its old output $e_6$ with the new value of $e_5$ and corrects $e_6$ accordingly. The apparatus is preferably designed so that a full operating cycle, i.e., from $t_0$ to $t_0$, has a time interval which is small compared to the rate of change in $e_1$ and $e_2$.

Figure 3:
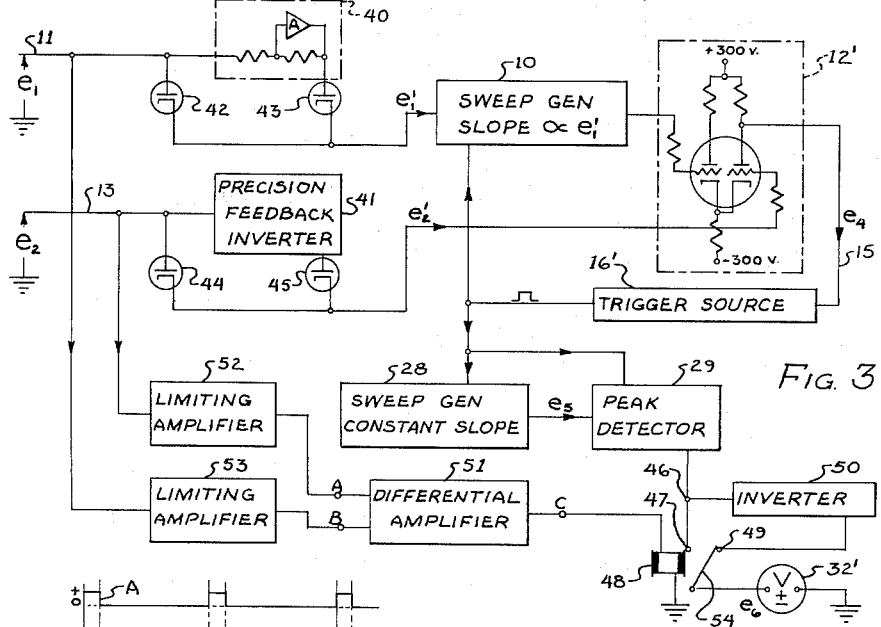
FIG. 3 represents schematically a circuit arrangement with which both positive and negative quantities may be divided.

The embodiment of the invention illustrated in FIG. 3 contains substantially all of the circuit elements of FIG. 1 and operates fundamentally the same. This embodiment in addition is equipped to accommodate both polarities for the input values $e_1$ and $e_2$ and to impart the proper polarity to the output $e_6$.

The voltages $e_1$ and $e_2$ on the supply lines 11 and 13 are fed to precision inverter amplifiers 40 and 41 so that $e_1$, $-e_1$, $e_2$ and $-e_2$ are all available. Diodes 42 and 43 connect, respectively, the supply line 11 and the output of the inverter 40 in such manner that only positive voltages can pass and therefore the input $e_1'$ to the sweep circuit 10 is always positive and equal in magnitude to the denominator voltage $e_1$. In the same manner diodes 44 and 45 connect, respectively, the supply line 13 and the output of the inverter 41 to a voltage comparator 12' so that the voltage $e_2'$ applied thereto is always positive and equal in magnitude to the numerator voltage $e_2$. As was the case in the arrangement of FIG. 1 the comparator 12' (here shown as a resistance-mixer type to improve D.C. stability) produces a pulse $e_4$ on the lead 15 when the output voltage $e_3$ of the sweep generator 10 starts to exceed the voltage $e_2'$ which pulse is applied to a trigger source 16' to trip it for a desired time interval. As before, the output of the trigger source 16' re-clamps the sweep generators 10 and 28 and actuates the peak detector 29 to post on its output terminal 46 the new value of $e_6$ which is always positive. The positive voltage $e_6$ appears on one contact 47 of a relay 48 the other contact 49 of which receives an equal voltage of negative polarity from an inverter 50. Thus if the relay 48 is appropriately energized the voltmeter 32' will read correct polarity as well as magnitude.

The relay 48 is connected to the output terminal C of a differential amplifier 51 having input terminals A and B connected, respectively, through limiting amplifiers 52 and 53 to the supply lines 13 and 11. The differential amplifier 51 is so connected that the potential output on its terminal C has a high value when the potentials on its input terminals A and B are of the same polarity and a low output potential when the inputs are of opposite polarity. Thus by choosing the relay 48 so that it will attract its armature 54 only on high value signals it will be evident that opposite polarities on the supply lines 11 and 13 will leave the armature contact 54 in the position shown and the voltmeter 32' will read a negative voltage, whereas like polarities on the input terminals A and B will cause the relay 48 to move its armature 54 into engagement with the contact 47 and the voltmeter 32' will read a positive voltage. The switching action performed by the relay 48 would in practice preferably be accomplished by the gating action of an electronic switch in any well known manner such as a feedback amplifier.

From the foregoing it will be evident that the present arrangement not only divides one voltage by another but imparts the correct polarity to the output signal without requiring the computer portion of the circuit to handle other than positive voltages which of course among others simplifies re-clamping of the sweep circuits and comparing of voltages.

While for the purpose of disclosing the invention only the presently preferred embodiment has been described in detail so as to enable those skilled in the art to practice the invention, it is to be understood that the invention is not limited thereto but includes those changes and modifications which do not depart from the spirit and scope of the invention as set forth in the appended claim.

What is claimed is:

A computer system for dividing a numerator voltage by a denominator voltage comprising in combination:
  a first generator of a voltage rising linearly at a rate proportional to an applied voltage,
  a second generator of a voltage rising linearly at a preselected constant rate,
  means for applying the denominator voltage to said first generator,
  means including a comparison circuit responsive to the rising voltage from said first generator becoming equal to the numerator voltage for indicating as the quotient of the applied numerator and denominator voltages the voltage present in said second generator at the time it has been operating for a time interval equal to the time interval required for the voltage of the first saw-tooth generator to equal the applied numerator voltage, and
  the means for applying the denominator voltage to said first generator and a connection between the numerator voltage and the comparison circuit each includes two unidirectional paths one of which paths includes an inverter, the indicating means includes two circuit paths one of which is normally closed and contains an inverter, and means responsive to the numerator and denominator voltages being of like polarities for opening the normally closed circuit path and closing the other of said two circuit paths.

References Cited in the file of this patent
UNITED STATES PATENTS

| 2,397,540 | Dome | Apr. 2, 1946 |
| 2,880,935 | Johnson | Apr. 7, 1959 |

OTHER REFERENCES

"A Time-Sharing Analog Multiplier" (Freeman et al.) Transactions of the IRE, Professional Group On Electronic Computers, March 1954.